Patented Aug. 24, 1926.

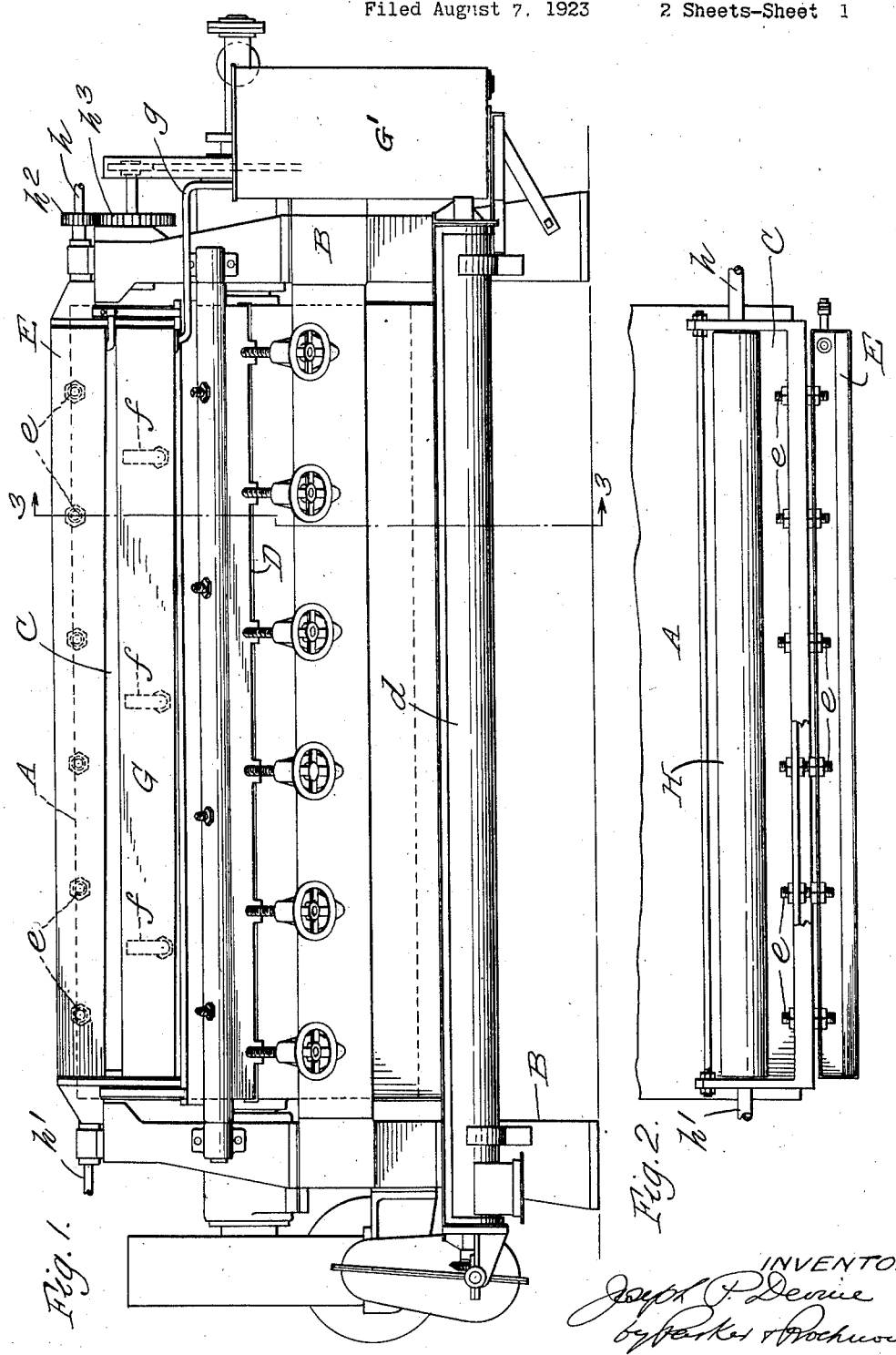

1,597,183

UNITED STATES PATENT OFFICE.

JOSEPH P. DEVINE, OF BUFFALO, NEW YORK.

FEED MECHANISM FOR ROTARY-DRUM DRIERS.

Application filed August 7, 1923. Serial No. 656,227.

This invention relates to rotary drum driers, and particularly to the means for feeding the material to be dried thereto.

The objects of the invention are to provide means of improved construction for providing a constant and uniform supply of the material to be dried to the drum so that the surface of the drum will be uniformly coated with this material; also to provide means of improved construction for regulating the level of the liquid in the feed tank; also to provide apparatus of this kind with a feed roll of improved construction for ensuring an even distribution of material in the drying drum; and also to improve the construction of apparatus of this kind in other respects hereinafter specified.

In the accompanying drawings:

Fig. 1 is a side elevation of a rotary drum drier provided with a feed mechanism embodying the invention.

Fig. 2 is a fragmentary top plan view thereof.

Figure 3:
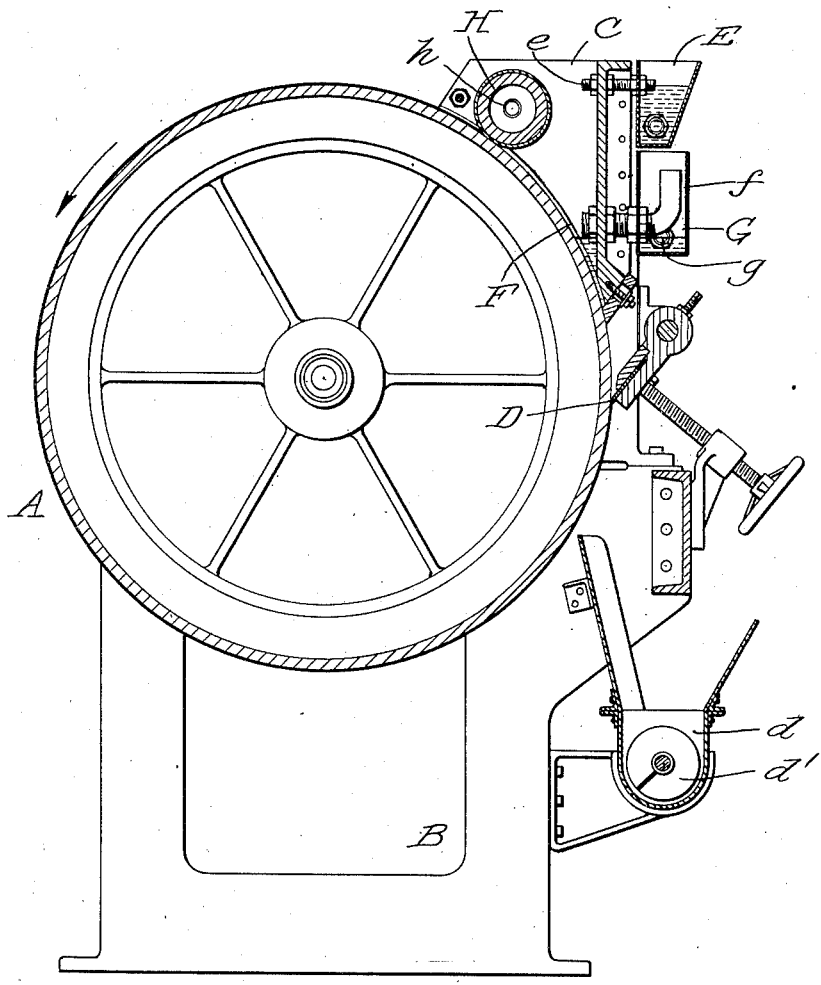
Fig. 3 is a transverse sectional elevation thereof on line 3—3, Fig. 1.

The rotary drum drier on which my invention is used may be of any suitable kind, that shown including a drum A, the outer surface of which is exposed to the atmosphere and the interior of which is connected with a suitable supply of steam or other heating medium. The drum is mounted on a frame including a pair of end frame members or legs B on which the parts of the drier are supported. The material to be dried is supplied to a feed trough C of usual construction, one wall of the trough being formed by the cylindrical face of the drying drum, and the trough is supplied with liquid which is coated on the drying drum which revolves in the direction indicated by the arrow on Fig. 3. After the drum has made nearly a complete revolution, the dried material is removed from the drum by means of a knife or scraper D and discharged into a conveyor trough $d$ having a spiral conveyor $d'$ therein which discharges the dried material from the machine. All of these parts have heretofore been used in connection with rotary drum driers and may be of any suitable construction. It will also be understood that this invention is not limited to use in connection with driers of the particular construction shown in the drawings, but may be used in connection with rotary drum driers of other kinds.

It has heretofore been customary to regulate the level of the liquid in the feed trough by means of a float controlled valve which regulates the flow of liquid to the feed trough. With certain fairly thick or slow flowing liquids, such, for example as buttermilk, it has been found that since the drum is generally of considerable length, the liquid level will not be the same in all parts of the trough, the liquid being at a higher level near the feed pipe and lower at points distant from the feed pipe. In order to overcome this objection, the following construction is preferably employed.

An upper supply tank or trough E is arranged near the upper portion of the feed trough C and the material to be dried is supplied to the supply trough in any suitable manner. This supply trough may be connected with the feed trough either by means of a single aperture disposed lengthwise of the trough, or as shown in the accompanying drawings, by means of a plurality of apertures spaced at intervals lengthwise of the trough, such as pipes $e$, and adapted to conduct liquid from the supply trough or tank E to different portions of the feed trough C. By means of this construction a substantially uniform supply of liquid is insured throughout the length of the feed trough.

In order to maintain the liquid in the feed trough at any desired level, either a slot-shaped, horizontally disposed aperture or a plurality of smaller apertures spaced at intervals horizontally and lengthwise of the drier may be provided. In the construction shown, a plurality of short overflow pipes F connect the feed trough C with an overflow tank or trough G which is preferably arranged at a side of the drier adjacent to the feed trough. Each of the pipes F is provided with means for regulating the level of the liquid in the feed trough by varying the level of an end of the overflow pipe. In the construction shown for this purpose, each overflow pipe is connected at the discharge end thereof with an elbow or L-shaped pipe section $f$ which is adapted to be turned about its connection with the pipe F. The open end $f'$ of the elbow is consequently adjustable to different elevations in the overflow trough, so that the level of the liquid in the feed trough may be varied as desired by merely swinging the elbows of the overflow pipes to different angular positions, the elbows maintaining the maximum level of liquid in the feed trough when arranged in upright positions, as shown in Figs. 1 and 3. By providing an overflow at a plurality of points spaced at intervals, the level of liquid in the feed tank can be maintained more uniform throughout the tank than in cases where the usual float control is used. Means of any suitable kind may be provided for draining the liquid from the overflow tank G, for example, a discharge pipe $g$ may be used as shown in Fig. 1, which conducts the liquid to a receiving tank G', from where the liquid may again be returned to the upper feed tank.

By means of the construction described, the level of the liquid in the feed tank may be easily maintained uniform throughout the tank, and if it is desired to change the level of the liquid, this can easily be done by setting elbows of the overflow pipes F into different angular positions. The supply of liquid to the supply tank can be easily regulated by a valve or other means, not shown, so that very little liquid passes through the overflow pipes into the overflow tank or trough.

In order to insure a uniform drying of the material on the drum, it is necessary to coat the material to be dried uniformly on the drum and with some kinds of material, this is a difficult problem, particularly with materials, such for example, as buttermilk, which are not of uniform consistency. I have found that if a chilled or cooled roll is used to press a lactic material, such as buttermilk, on the drying drum, the material will not adhere to the cold roll and will be pressed or flattened by the roll into a uniform layer. In the construction shown for this purpose, a hollow roll H is employed, which is arranged with its periphery at a short distance from the periphery of the drum, and a suitable cooling medium, such as cold water, is preferably passed through the roll in any suitable manner, for example by means of an inlet pipe $h$ at one end of the roll and a discharge pipe $h'$ at the other end thereof, these pipes having a suitable connection with the roll whereby the roll is free to turn relatively to the pipes. Means are also provided for turning the roll at substantially the same peripheral speed as the drying drum, gears $h^2$ and $h^3$ being shown for this purpose, which may be driven in any suitable manner. This roll presses the material on the drying drum down to a layer of uniform thickness and by cooling the roll, it has been found that such materials as, for example, buttermilk, will not adhere to the roll.

The apparatus described is particularly well adapted for drying such materials as are not of uniform consistency and are apt to contain lumps which interfere with the operation of the usual float valves, commonly employed for maintaining a level in the feed trough, and the lumps in the material, in adhering to the surface of the drying drum are flattened out by the cooled roll H, so that buttermilk and other liquids can be dried in the machine described to produce a uniformly dried material and without necessitating the frequent stopping of the machine to remove obstructions from the liquid supply means. The provision of means for ensuring a uniform level in the feed trough of the material to be dried insures a uniform coating of the drying cylinder or drum, which also tends to produce a uniformly dried material.

I claim as my invention:

1. In a rotary drum drier, the combination of a drying drum, a feed trough adapted to maintain material to be dried in contact with said drum, a plurality of pipes arranged at intervals throughout the length of said feed trough and adapted to supply liquid to said trough, and a plurality of overflow pipes connected with said feed trough and also arranged at intervals lengthwise thereof and adjustable independently of each other for controlling the level of liquid in said feed trough.

2. In a rotary drum drier, the combination of a drying drum, a feed trough adapted to contain material to be dried and arranged in contact with said drum, a plurality of pipes arranged at intervals throughout the length of said feed trough and adapted to supply liquid to said trough, a plurality of overflow pipes connected with said feed trough, and means on each of said overflow pipes for regulating the height of an end of each pipe to control the level of liquid in said feed trough.

3. In a rotary drum drier, the combination of a drying drum, a feed trough adapted to contain material to be dried and arranged in contact with said drum, means for supplying liquid to said feed trough, and a plurality of overflow pipes connected with said feed trough and each having an end piece movably arranged and which may be adjusted to different elevations to regulate the level of the liquid in said feed trough.

4. In a rotary drum drier, the combination of a drying drum, a feed trough adapted to contain material to be dried and arranged in contact with said drum, means for supplying liquid to said feed trough, an overflow pipe connected with said feed trough, and a bent pipe section having at one end a swiveled connection with said overflow pipe, whereby the other end thereof may be arranged at different elevations to control the level of liquid in said trough.

5. In a rotary drum drier, the combination of a drying drum, a feed trough adapted to contain material to be dried and arranged in contact with said drum, a supply tank arranged near the upper portion of said feed trough, a plurality of pipes connecting said supply tank with said feed trough and arranged at intervals lengthwise of the feed trough, overflow pipes also connected with said feed trough and spaced at intervals lengthwise of the trough, and adjustable means on said overflow pipes for regulating the elevation of the ends of said pipes to control the level of liquid in the feed trough.

6. In a rotary drum drier, the combination of a drying drum, a feed trough adapted to contain material to be dried and arranged in contact with said drum, a supply tank arranged near the upper portion of said feed trough, a plurality of pipes connecting said supply tank with said feed trough and arranged at intervals lengthwise of the feed trough, overflow pipes also connected with said feed trough and spaced at intervals lengthwise of the trough, each of said overflow pipes being provided at its discharge end with a bent pipe having a swiveled connection with the overflow pipe to permit the other end thereof to be moved to different elevations for regulating the level of liquid in said feed trough, and an overflow trough into which said overflow pipes are adapted to discharge.

7. In a rotary drum drier, the combination of a drying drum, a feed trough adapted to contain material to be dried, an aperture arrangement throughout the length of the feed trough and adapted to supply liquid to said trough, an aperture arrangement throughout the length of the feed trough for controlling the level of liquid in said feed trough and means for controlling different portions of said last mentioned aperture arrangement independently of other portions for regulating the liquid level in said feed trough.

8. In a rotary drum drier, the combination of a drying drum, a feed trough adapted to contain material to be dried, means to supply liquid to said feed trough on more than one point along its length, means for providing overflow on more than one point along its length and means for independently controlling said overflow at different points.

9. In a rotary drum drier, the combination of a drying drum, a feed trough adapted to contain material to be dried, an aperture arrangement provided in the upper portion of the feed trough and adapted to supply liquid to said feed trough on more than one point along its length, and an aperture arrangement provided in the lower portion of the feed trough connecting said feed trough with a receptacle adapted to provide an overflow at more than one point along the length of the feed trough, and means to regulate the level of the overflow independently at different points.

JOSEPH P. DEVINE.